United States Patent
Starch

(10) Patent No.: US 7,516,127 B2
(45) Date of Patent: Apr. 7, 2009

(54) REPORTING MODULE DEFINITION LANGUAGE SYSTEM AND METHOD

(75) Inventor: Jesper Starch, Alleroed (DK)

(73) Assignee: Computer Associates Think, Inc., Islandia, NY (US)

( * ) Notice: Subject to any disclaimer, the term of this patent is extended or adjusted under 35 U.S.C. 154(b) by 309 days.

(21) Appl. No.: 11/131,699

(22) Filed: May 18, 2005

(65) Prior Publication Data

US 2005/0262074 A1    Nov. 24, 2005

Related U.S. Application Data

(60) Provisional application No. 60/573,118, filed on May 21, 2004.

(51) Int. Cl.
*G06F 17/30* (2006.01)
(52) U.S. Cl. .................. 707/4; 707/3; 707/7; 707/10
(58) Field of Classification Search ............... 707/2–7, 707/10, 102, 200, 204
See application file for complete search history.

(56) References Cited

U.S. PATENT DOCUMENTS

| | | | | |
|---|---|---|---|---|
| 5,226,161 | A * | 7/1993 | Khoyi et al. ............. | 719/316 |
| 5,680,618 | A * | 10/1997 | Freund ..................... | 707/7 |
| 5,937,409 | A | 8/1999 | Wetherbee | |
| 6,041,344 | A * | 3/2000 | Bodamer et al. ......... | 709/203 |
| 6,236,997 | B1 * | 5/2001 | Bodamer et al. ......... | 707/10 |
| 6,516,326 | B1 | 2/2003 | Goodrich et al. | |
| 6,643,640 | B1 * | 11/2003 | Getchius et al. ......... | 707/3 |
| 6,792,414 | B2 | 9/2004 | Chaudhuri et al. | |
| 6,947,950 | B2 * | 9/2005 | Murthy et al. .......... | 707/103 R |
| 7,130,852 | B2 * | 10/2006 | Parent .................... | 707/9 |
| 7,146,356 | B2 * | 12/2006 | Choi et al. .............. | 707/3 |
| 2001/0034733 | A1 | 10/2001 | Prompt et al. | |
| 2002/0024538 | A1 | 2/2002 | Bandaru et al. | |
| 2002/0188538 | A1 * | 12/2002 | Robertson et al. ........ | 705/35 |
| 2003/0097462 | A1 | 5/2003 | Parent et al. | |
| 2003/0212904 | A1 * | 11/2003 | Randle et al. ............ | 713/200 |
| 2004/0181543 | A1 | 9/2004 | Wu et al. | |
| 2004/0193579 | A1 | 9/2004 | Dettinger et al. | |

OTHER PUBLICATIONS

Preece et al., "The KRAFT Architecture for Knowledge Fusion and Transformation", *SGES International Conference on Knowledge-Based System sand Applied Artificial Intelligence*, Dec. 13, 1999, pp. 1-16, XP002230504.
Carey et al., "Data Access Interoperability in the IBM Database Family", *Bulletin of the IEEE Computer Society Technical Committee on Data Engineering*, vol. 21, No. 3, Sep. 1998, pp. 1-8, XP-002341681.
Olson et al., "The Sybase Architecture for Extensible Data Management", *Bulletin of the IEEE Computer Society Technical Committee on Data Engineering*, Sep. 1998, pp. 12-24, XP-002356831.
Draper et al., "The Nimble XML Data Integration System", *Proceedings of the 17th International Conference on Data Engineering*, Apr. 2, 2001, pp. 155-160, XP-010538057.
Madhavan et al., "Generic Schema Matching with Cupid", *Proceedings of the International Conference on Very Large Data Bases*, 2001, pp. 1-10, XP-001152140.

* cited by examiner

*Primary Examiner*—Pierre M. Vital
*Assistant Examiner*—Loan T Nguyen
(74) *Attorney, Agent, or Firm*—Pillsbury Winthrop Shaw Pittman LLP

(57) ABSTRACT

In one embodiment, a method for data management includes receiving a request for information associated with an incompatible foreign data source and the compatible native data source. In response to at least the request, technical and logical information for locating and processing the foreign data source are automatically identified. Foreign data from the foreign data source is retrieved in accordance with the technical information. Native data from the native data source is retrieved. At least a portion of the foreign data and at least a portion of the native data is merged in accordance with at least the logical information.

15 Claims, 3 Drawing Sheets

REPORTING MODULE DEFINITION LANGUAGE SYSTEM AND METHOD

RELATED APPLICATION

This application claims the benefit of U.S. Provisional Application No. 60/573,118 filed May 21, 2004.

TECHINCAL FIELD

This invention relates to data management and, more particularly, to a reporting module definition language system and method.

BACKGROUND

Generic software applications are frequently used to access external data sources when processing a request from a user. These applications typically require that a user provide technical details in order to access external data sources. For example, the user frequently must provide a database name, a table name, a column name, and/or a link column in order to access the external data sources. After these details are provided, such applications retrieve and display the information. As a result, the user is fully aware that they are accessing external data sources. If integration of local data and external data is desired, the user may then manually integrate the local and external data.

SUMMARY

In one embodiment, a method for data management includes receiving a request for information associated with an incompatible foreign data source and the compatible native data source. In response to at least the request, technical and logical information for locating and processing the foreign data source are automatically identified. Foreign data from the foreign data source is retrieved in accordance with the technical information. Native data from the native data source is retrieved. At least a portion of the foreign data and at least a portion of the native data is merged in accordance with at least the logical information. The details of one or more embodiments of the invention are set forth in the accompanying drawings and the description below. Other features, objects, and advantages of the invention will be apparent from the description and drawings, and from the claims.

DETAILED DESCRIPTION

Figure 1:
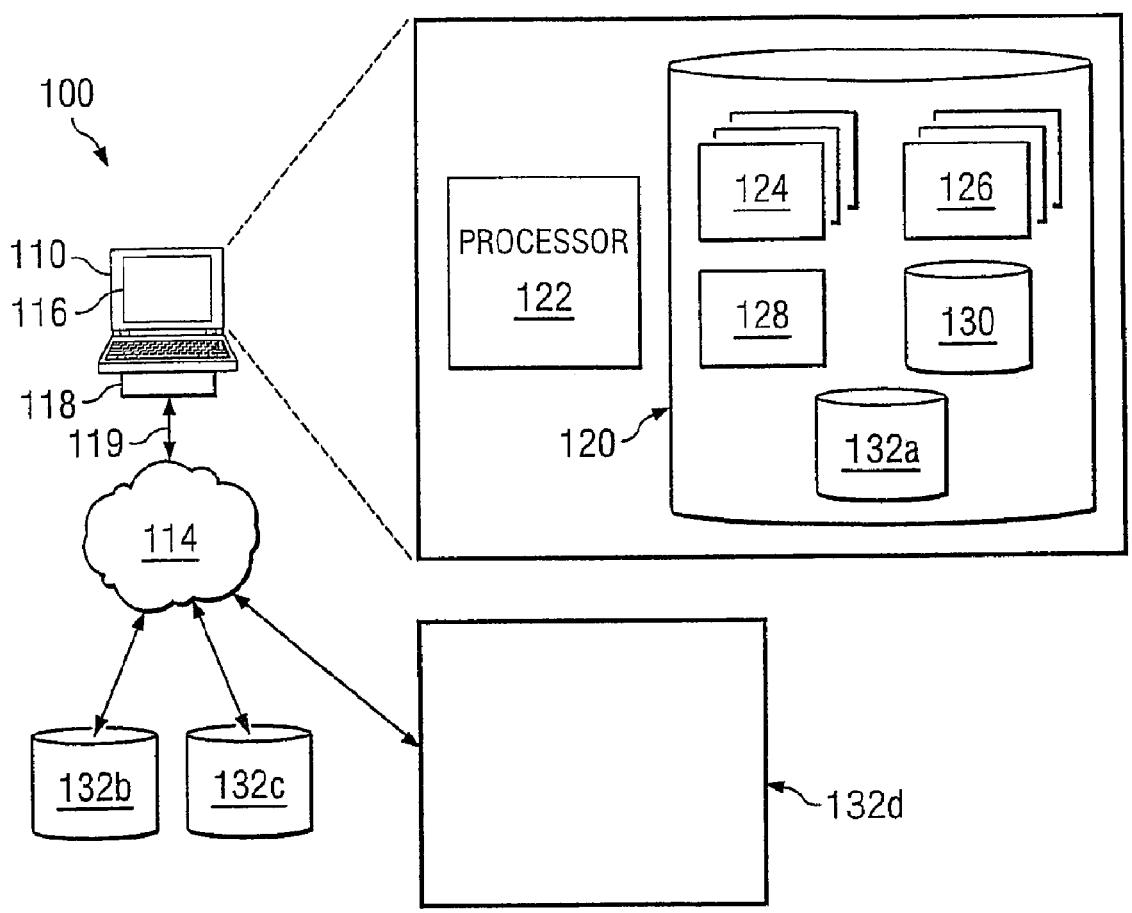
FIG. 1 is a data management system in accordance with one embodiment of the present disclosure.

FIG. 1 illustrates a data management system 100 for interfacing foreign data with a native application. Foreign, as used herein, means any component, object, value, variable, and/or data and/or data schema that is not directly processible, accessible, or otherwise capable of communicating with native application 128. Indeed, this foreign data is merely in terms of native application 128—in other words, the foreign data may be (and often is) local to system 100 or even physically resident or the same computer as native application 128. In general, system 100 is operable to integrate information from foreign data sources 132 into the logical information space of native application 128 while technical and logical details remain hidden from the user. Computer applications used for generic data extraction, reporting, and visualization, such as native application 128, typically need to be able to access data from a wide variety of sources, including sources that were unknown, non-existent, or unanticipated at the time of development. For example, foreign data sources 132 may have been unknown, non-existent, or unanticipated at the time that native application 128 was developed or rebased and, as a result, foreign data sources 132 may be incompatible with native application 128. In addressing this incompatibility, system 100 may use reporting modules 124 to provide a formalized way of representing technical, logical, and integration-specific properties of foreign data sources 132. As a result, the foreign data may be seamlessly integrated into the logical information space of native application 128 and may allow native application 128 to present a user-friendly, descriptive interface for navigating foreign data without requiring the user to provide (or even know) technical and/or logical details.

At a high level, system 100 is a distributed environment comprising computer 110 communicably coupled to foreign data sources 132 via network 114. Computer 110 may comprise a portion of an information management system operable to automatically retrieve information from foreign data sources 132 and automatically map the foreign data to logical names, categories, and/or formatting compatible with native application 128 without requiring the user to provide any technical and/or logical details. The term "automatically," as used herein, generally means that the appropriate processing is substantially performed by computer 118 or other computing component. It should be understood that automatically further contemplates any suitable user interaction with computer 110. In this case, native application 128 may present both foreign and native data to a user of native application 128 such that the user may navigate, use, format, or otherwise understand the presented data without any required knowledge of its origin. Returning to the illustrated embodiment, computer 110 includes a Graphical User Interface (GUI) 116, network interface 118, memory 120, and processor 122. The present disclosure includes a repository of reporting modules 124 that may be stored in memory 120 and may be processed by processor 122. FIG. 1 only provides one example of a computer that may be used with the disclosure. The present disclosure contemplates computers other than general purpose computers as well as computers without conventional operation systems. As used in this document, the term "computer" is intended to encompass a mainframe, a personal computer, a client, a server, a workstation, a network computer, a personal digital assistant, a mobile phone, or any other suitable local or remote processing device. Moreover, "computer 110" and "user of computer 110" may be used interchangeably as appropriate.

GUI 116 comprises a graphical user interface operable to allow the user of computer 110 to interact with native application 128. Generally, GUI 116 provides the user of computer 110 with an efficient and user-friendly presentation of data provided by computer 110. GUI 116 may comprise a plurality of displays having interactive fields, pull-down lists, and buttons operated by the user. And in one example, GUI 116 presents an explore-type interface and receives commands from the user. It should be understood that the term graphical user interface may be used in the singular or in the plural to describe one or more graphical user interfaces in each of the displays of a particular graphical user interface. Further, GUI 116 contemplates any graphical user interface, such as a generic web browser, that processes information in computer 110 and efficiently presents the information to the user. Network 114 can accept data from the user of computer 110 via the web browser (e.g., Microsoft Internet Explorer or Netscape Navigator) and return the appropriate Hyper Text Markup Language (HTML) or eXtensible Markup Language (XML) responses.

As appropriate, computer 110 generates requests and/or responses and communicates them to another client, server, or other computer systems located in or beyond network 114. For example, computer 110 may receive foreign data for displaying to a user through native application 128. Network 114 facilitates wireless or wireline communication between computer 110 and any other computer. Network 114 may communicate, for example, Internet Protocol (IP) packets, Frame Relay frames, Asynchronous Transfer Mode (ATM) cells, voice, video, data, and other suitable information between network addresses. Network 114 may include one or more local area networks (LANs), radio access networks (RANs), metropolitan area networks (MANs), wide area networks (WANs), all or a portion of the global computer network known as the Internet, and/or any other communication system or systems at one or more locations. Illustrated computer 110 includes network interface 118 for communicating 10 with other computer systems over network 114 such as, for example, in a client-server or other distributed environment via link 119. Generally, interface 118 comprises logic encoded in software and/or hardware in any suitable combination to allow computer 110 to communicate with network 114 via link 119. More specifically, interface 118 may comprise software supporting one or more communications protocols associated with link 119 and communication hardware operable to communicate physical signals.

Memory 120 may include any memory or database module and may take the form of volatile or non-volatile memory including, for example, magnetic media, optical media, Random Access Memory (RAM), Read Only Memory (ROM), removable media, or any other suitable local or remote memory component. In the illustrated embodiment, memory 120 includes reporting modules 124, foreign key tables 126, native application 128, and a native data source 130. Native application 128 is any suitable application running on computer 110 that is operable to invoke reporting modules 124 for retrieving data from foreign data sources 132. For example, application 128 may comprise a Web-based program, a data management tool, an enterprise application, or any other software application that is operable to receive and/or transmit information to foreign data sources 132. It will be understood that while application 128 is illustrated as a single multitasked module, the features and functionality performed by this engine may be performed by multiple modules. Moreover, application 128 may comprise a child or submodule of another software module, not illustrated, without departing from the scope of this disclosure. In short, native application 128 is any suitable software application or generic module that can access and process data from native data source 130.

Native data source 130 comprises any logical or physical storage for the management of suitable information that is directly accessible and processible by native application 128. According to one embodiment, native data source 130 comprises a relational database, such as Database 2 (DB2) or Oracle, normally accessed through SQL statements. Relational databases use sets of schemas to describe the tables, columns and relationships in the tables using basic principles known in the field of database design. Alternatively, native data source 130 may comprise XML documents, an object-oriented database, flat files, Btrieve files, VSAM files, name-value-pair files, CSV files, objects, or others.

Each reporting module 124 comprises instructions, mappings, algorithms, or any other directive used by native application 128 to access, retrieve, and process information stored in foreign data sources 132. Reporting module 124 may include technical data such that native application 128, using the technical data, may access and retrieve data from, for example, a column of a database table stored in foreign data source 132 often without requiring recoding of native application 128 or input from the user. In addition, the technical data may be used to link foreign and native data. Technical information may include one or more of the following: a network address, login information, a database server name, a database name, a data source name, a database table name, a column name, database commands, keys or identifiers contained in native data, or other foreign data source identifiers or information associated with retrieving and/or processing foreign data. In addition, reporting module 124 may include logical data such that computer 110, using the logical data, may provide, map, or otherwise associate logical names, categories, and/or formats that are compatible with native application 128 to the foreign data. In other words, logical data may be used to map foreign data into the logical domain of native application 128 and, thus, making the foreign data available to a user of native application 128. In general, reporting modules 124 include a formalized way of representing technical, logical, and integration-specific properties of a foreign data source 132. As a result, reporting modules 124 often eliminates the need for the user to know technical details of a foreign data source 132 such as, for example, a database name, a table name, a column name, a link column, database schema, and others. In this case, a user may be unaware that they are accessing a foreign data source 132 and/or the origin of presented data.

Each reporting module 124 may be associated with a single foreign data source 132 or multiple foreign data sources 132 may be associated with a single reporting module 124. Reporting module 124 may be any suitable format such as, for example, a text file, binary file, an XML document, a flat file, a comma-separated-value (CSV) file, a name-value pair file, a Structured Query Language (SQL) table, one or more libraries, or others as long as native application 128 communicably coupled with reporting modules 124 is operable to as least partially open, read, manage, and/or operated reporting modules 124. In some embodiments, reporting modules 124 are implemented as a computer file using keywords and variables describing the technical, logical, and relational aspects of associated foreign data sources 132. The set of keywords and variables may referred to as a Definition Language of reporting modules 124. Moreover, the Definition Language may not be limited to a specific set of keywords and variables. Instead, the keywords, parameters, tags, and variables for describing a foreign data source 132 may be dynamically or automatically defined by native application 128 or defined by any other process and/or individual as long as they are supported and processible by native application 128. Reporting module 124 may be dynamically created or populated by computer 110, a third-party vendor, any suitable user of computer 110, loaded from a default file, or received via network 114. The term "dynamically" as used herein, generally means that the appropriate processing is determined at run-time based upon the appropriate information. In addition, reporting modules 124 may be created, deployed, and maintained independently of native application 128 and/or associated foreign data sources 132. Accordingly, the foreign data available to native application 128 may be expanded and/or enhanced by adding or enhancing reporting modules 124, typically without modifying or altering the binary modules of native application 128 or the associated foreign data sources 132.

Based, at least in part, on reporting module 124, computer 110 generates foreign key table 126. Foreign key table 126 comprises instructions, algorithms, or any other directive used by computer 110 to link or otherwise associate foreign data to keywords or identifiers contained in native data. For example, foreign key table 126 may identify a field in foreign data source 132 and link it to a keyword or identifier contained in native data. In another example, foreign key table 126 may identify a keyword or identifier contained in foreign data and link the external keyword or identifier to a keyword or identifier contained in native data. An external field may be linked to a single or multiple native keywords or identifiers, or multiple native keywords or identifiers may be linked to a single external field. Foreign key table 126 may be any suitable format such as, for example, a text file, binary file, an XML document, a flat file, a CSV file, a name-value pair file, SQL table, one or more libraries, or others. Foreign key table 126 may be dynamically created or populated by computer 110, a third-party vendor, any suitable user of computer 110, loaded from a default file, or received via network 114.

Each foreign data source 132 is generally any logical or physical data repository, whether local or remote, that is foreign to native application 128. Examples of foreign data source 132 include relational databases, object-oriented databases, file systems, document storage systems, or any other suitable storage or data structure. In one example, foreign data sources 132 comprise relational database servers including a relational database typically accessed through SQL statements. In this example, foreign data source 132 may be any computer or processing device such as, for example, a blade server, a server pool, general-purpose personal computer (PC), Macintosh, workstation, Unix-based computer, or any other suitable device. Foreign data sources 132 may be adapted to execute any operating system including Linux, UNIX, Windows Server, or any other suitable operating system. In another example, foreign data source 132 may also be the object-oriented database, XML documents, Btrieve files, flat files, CSV files, text files, and/or other data structures or objects. In yet another example, foreign data source 132 may be a data repository, structure, or item similar to native data source 130, but not directly accessible or compatible with native application 128. Put another way, application 128 may have been coded to be compatible or interact with a first version of a data structure (native data source 130), while being at least slightly incompatible with a second (older or newer) version of the same data structure (foreign data source 132).

Figure 2:
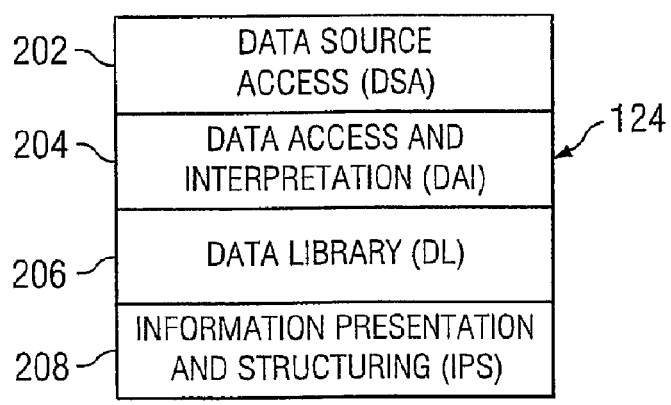
FIG. 2 is a reporting module in accordance with one embodiment of the present disclosure.

In one aspect of operation, application 128 displays items such that application 128 may retrieve and present certain data in response to a user's selection. For example, application 128 may display the following information items: employee name, employee title, salary, children, and assigned car. In response to the selection by the user, application 128 identifies and retrieves native data associated with the selected items from native data source 130. In the example, the user of application 128 may select employee name, title, and assigned car and, in response to the selection, application 128 may retrieve employee name and title from native data source 130. In addition, application 128 identifies any reporting modules 124 associated with the selected items as needed or appropriate. Returning to the example, application 128 may identify a particular reporting module 124 associated with the information item "assigned car." In the case that a foreign key table 126 associated with the identified reporting module 124 has not been generated, application 128 may automatically generate at least one foreign key table 126 for linking foreign data to native data. Using the foreign key table 126 and technical descriptions provided by reporting module 124, application 128 accesses foreign data sources 132 to retrieve data associated with the selected items. In the example, application 128 may identify a foreign identifier using the employee name and an associated foreign key table 126 associated with the information item "assigned car" and, once identified, application 128 may retrieve the data associated with the foreign identifier including information associated with a car assigned with the employee. After the foreign data is retrieved, application 128 uses the logical description in the identified reporting modules 124 to merge the native data and the foreign data. In the example, the application 128 may identify the make, model, and year of the assigned car and map this data to the identifier "assigned car." The application then often combines the native data and the foreign data for presentation to the user FIG. 2 illustrates one embodiment of reporting module 124. At a high level, reporting module 124 includes a plurality of logical sections such as, for example, data source access (DSA) 202, data access and interpretation (DAI) 204, data linking (DL) 206, and information presentation and structuring (IPS) 208. But, of course, these sub-modules are for example purposes only and reporting module 124 may include none, some, or all of the illustrated sub-modules as well as other sub-modules. Moreover, one or more of the sub-modules may be remote to, dynamically linked to, or physically or logically separated from the other sub-modules as appropriate.

Example DSA 202 is any entry or data structure that generally describes or instructs how a foreign data source 114 is accessed. For example, DSA 202 may include a database server identifier (e.g., name, network address) and/or a database identifier (e.g., name). DSA 202 may include any other information that may be used to physically access a foreign data source 132 such as, for example, log-in information.

Example DAI 204 is typically any entry or data structure that describes or instructs how the data residing in the foreign data source 114 is accessed. For example, DAI 204 may include a database table identifier (e.g., name, pointer) and/or a column identifier (e.g., name). DAI 204 may include any other information that may be used for identifying specific data that can be retrieved from a foreign data source 132.

Example DL 206 is any instructions, algorithms, or any other directive used by application 128 to link or otherwise associate foreign data to native data. For example, DL 206 may be database commands, objects, or executables operable to generate some or all of a particular foreign key table 126. As discussed above, one or more fields of foreign data may be linked to one or more keys or identifiers contained in native data.

Example IPS 208 is any instructions, algorithms, or any other directive used to map foreign data into the logical domain of application 128. As a result, application 128 may present and organize foreign and native data logically, effectively hiding the technical information used to access the foreign data. IPS 208 may provide at least one of logical names, categories, or formatting for the foreign data associated with reporting module 124. Once provided, the foreign data and associated native data may be combined, joined, or otherwise merged and may enable the merged data to act and look as if it was retrieved from a single source.

In aspect of operation, native application 128 retrieves logical names and/or categories from IPS 208 and presents available information items to a user. In response to a selection from a user, native application 128 identifies reporting modules 124 associated with the selected informational items. Native application 128 also identifies fields associated with the selected information items using foreign key table 126. After identifying these fields, native application 128 uses technical details retrieved from DSA 202 to access an associated foreign data source 212. Once accessed, native application 128 retrieves data associated with the selected items using DAI 204. Native application 128 using IPS 208 then maps the retrieved data to logical names, categories, and/or formats familiar to the user of native application 128.

Figure 3:
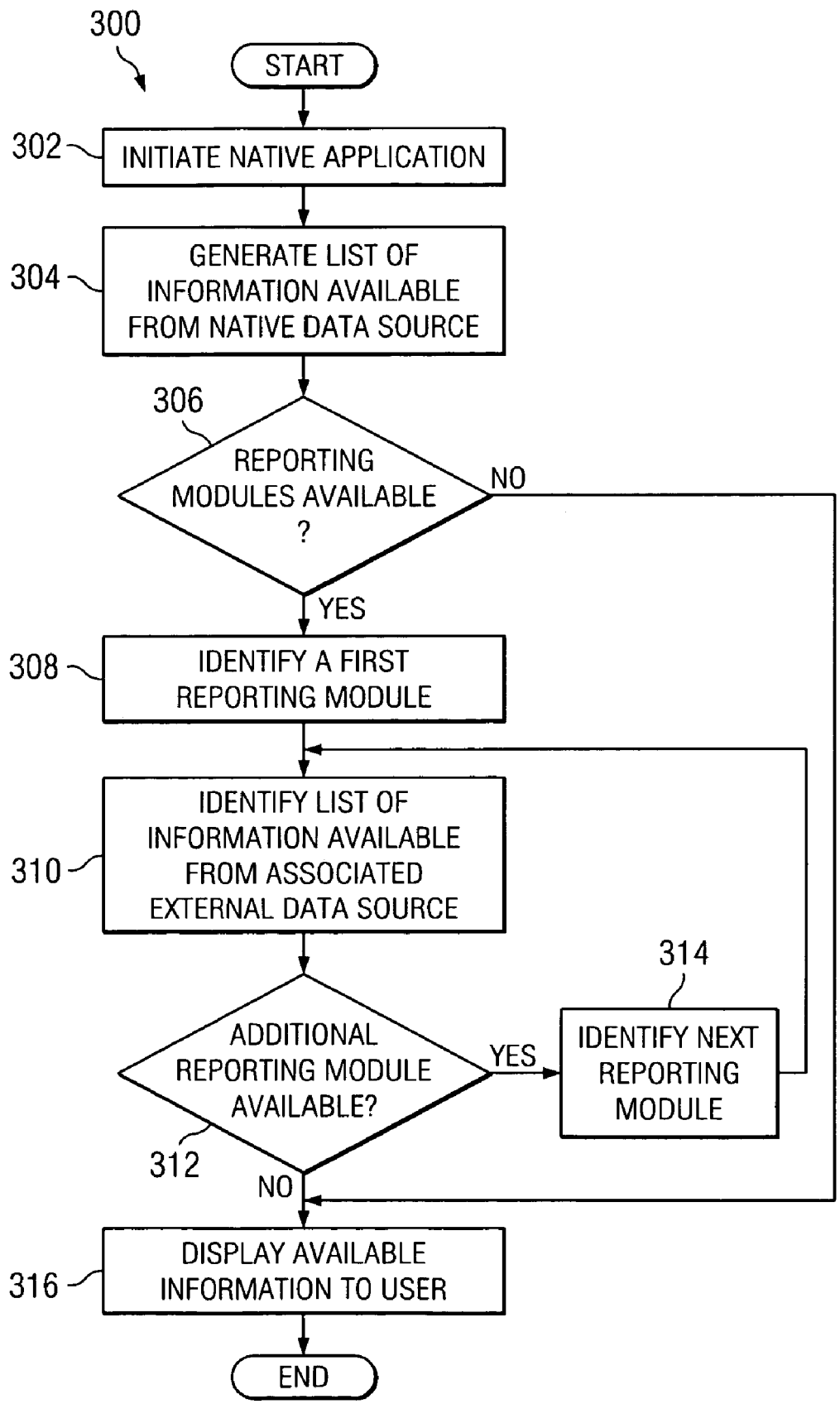
FIG. 3 is a flow diagram illustrating an example method for displaying available information.
Figure 4:
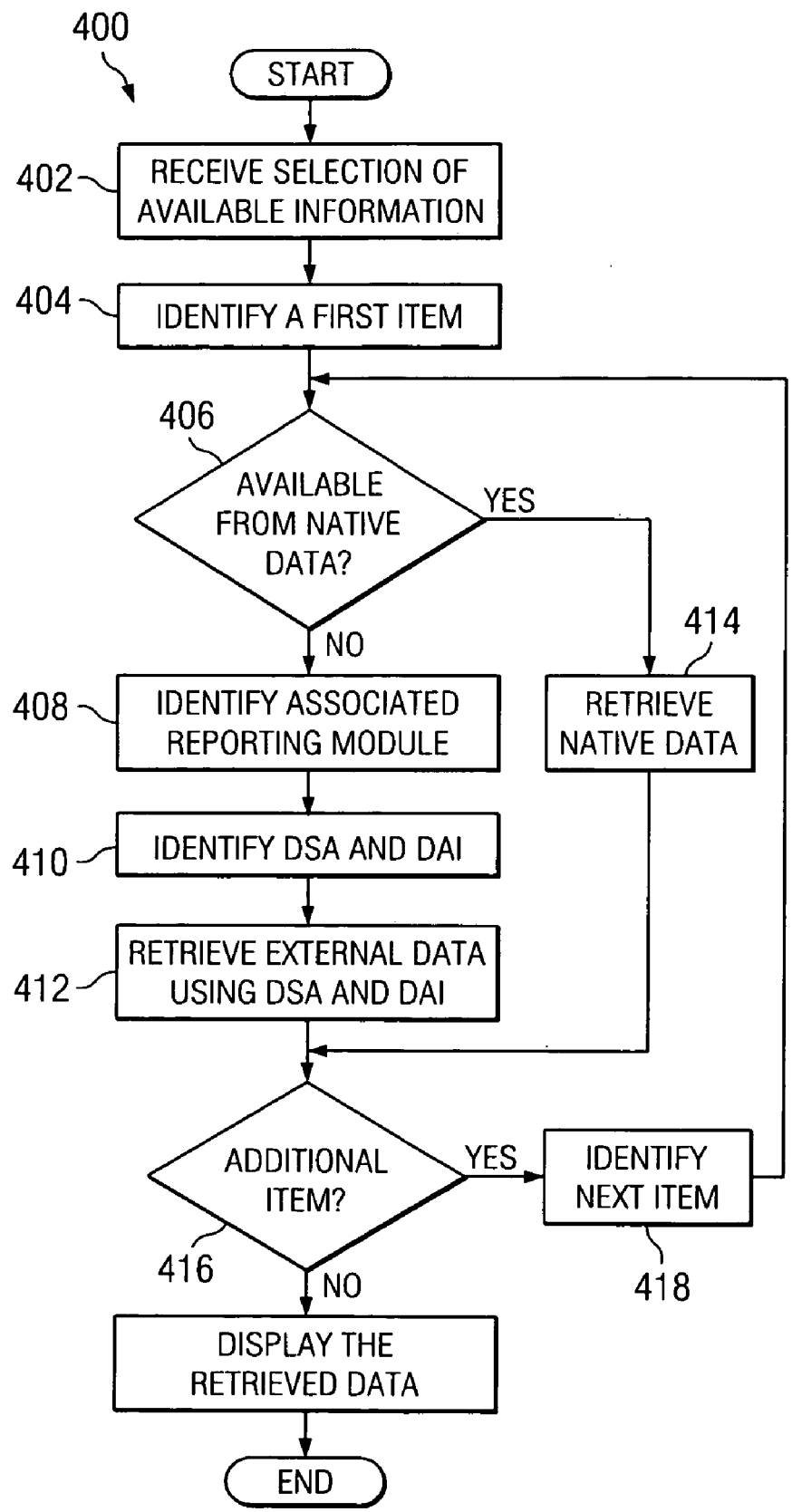
FIG. 4 is a flow diagram illustrating an example method for retrieving information.

FIGS. 3 and 4 are flow diagrams illustrating example methods 300 and 400, respectively, for managing information in system 100. Methods 300 and 400 are described with respect to system 100 of FIG. 1, but methods 300 and 400 could be used by any other device or components. Moreover, system 100 may use other suitable techniques for performing these tasks. Thus, many of the steps in this flowchart may take place simultaneously and/or in different orders as shown. System 100 may also use methods with additional steps, fewer steps, and/or different steps, so long as the methods remain appropriate.

FIG. 3 illustrates example method 300 for displaying information available in system 100. Method 300 begins at step 302 where native application 128 is initiated or executed. At step 304, application 128 generates a list of information available from native data source 130. If reporting modules 124 are available at decisional step 306, then native application 128 selects or identifies a first reporting module 124 at step 308. Next, at step 310, application 128 identifies information available from an associated foreign data source 132 using the selected reporting module 124. For example, application 128 may use IPS 208 to identify the information available from the associated foreign data source 132. If additional reporting modules 124 are available at decisional step 312, then application 128 selects a next reporting module 124 at step 314 and execution returns to step 310. If additional reporting modules 124 are not available at decisional step 312, then execution proceeds to step 316. Once any or all appropriate reporting modules 124 have been suitably identified and processed, then application 128 displays the available information to the user at step 316.

FIG. 4 illustrates method 400 for retrieving information in system 100. Method 400 begins at step 402 where application 128 receives a selection of available information from a user. At step 404, application 128 identifies a first item of the selected information. If information associated with the first item is not available from native data source 130 at decisional step 406, then application 128 identifies a reporting module 124 associated with the item at step 408. While not illustrated, application 128 may perform any suitable processing (including ignoring the particular item) in response to being unable to locate the appropriate reporting module 124. Next, at step 410, application 128 parses or otherwise processes DSA 202 and DAI 204 of the identified reporting module 124 and retrieves data associated with the item using DSA 202 and DAI 204 at step 412. Execution then proceeds to decisional step 416. Returning to decisional step 406, if information associated with the first item is instead available from native data source 130, then application 128 retrieves information associated with the item from native data source 130 at step 414. Once the item has been suitably processed, application 128 determines or identifies if there are additional items at decisional step 416. If there are additional items, then application 418 identifies the next item at step 418 and execution returns to decisional step 406. Once there are no additional items at decisional step 416, then, at step 420, application 128 displays the retrieved information to the user. In certain embodiments, the retrieved information associated with the particular item may be formatted for display purposes through formatting information, often found in the corresponding reporting module. For example, assume that a particular external item is known to be stored, referenced, or processed as number of grams (and should be treated by the current application 128 as number of grams), but the particular item should be displayed to the user as number of kilograms. In other words, the reporting modules support "display-only" formatting that will be evaluated at display time. Of course, in some situations, retrieving the information and displaying the information might not be performed by the same process or module—i.e., a server process may retrieve the data, while a client application may search the reporting modules for proper display formatting of the information.

Although this disclosure has been described in terms of certain embodiments and generally associated methods, alternatives and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer readable medium including computer-executable instructions thereon for retrieving and presenting information from foreign data sources to a user via a software application, wherein the computer-executable instructions operable when executed on a computing device cause the computing device to:

receive, by a software application, a request for information associated with a foreign data source incompatible with the software application and a native data source compatible with the software application, wherein the request is initiated by a user selection of the information associated with the foreign data source and the native data source at the software application;

in response to at least the request, automatically identify, by the software application, at least one module associated with the software application having technical and logical information for locating and processing the information associated with the foreign data source;

retrieve, by the software application, the information associated with the foreign data source from the foreign data source in accordance with the technical information;

retrieve, by the software application, the information associated with the native data source from the native data source;

dynamically link the information associated with the foreign data source with the information associated with the native data source in accordance with the technical information to enable merging of the information associated with the foreign data source and the information associated with the native data source; and merge, by the software application, at least a portion of the information retrieved from the foreign data source and at least a portion of the information retrieved from the native data source, wherein the software application uses the logical information to merge the foreign data source information and the native data source information and to integrate the foreign data source and the native data source in a logical domain of the software application.

2. The computer readable medium of claim 1, wherein the computer-executable instructions that cause the computing device to merge the information associated with the foreign data source and the information associated with the native data source using the logical information further cause the computing device to map the foreign data to identifiers compatible with native data in accordance with the logical information without input from a user.

3. The computer readable medium of claim 1, wherein the technical and logical information are stored in a reporting module, the reporting module integrated into the logical domain of the software application.

4. Computer readable medium of claim 1, wherein the technical information comprises at least one of a database identifier, a database table identifier, a column identifier, an Internet Protocol (IP) address, a logical location, a login name, a password, a data source identifier, a database command, or a key.

5. The computer readable medium of claim 1, wherein the information associated with the foreign data source and the information associated with the native data source are linked through a foreign key table.

6. A system for retrieving and presenting information from foreign data sources to a user via a software application, comprising:
    memory storing a compatible native data source;
    one or more processors configured to:
        receive, by a software application, a request for information associated with a foreign data source incompatible with the software application and the compatible native data source, wherein the request is initiated by a user selecting the information associated with the foreign data source and the native data source at the software application;
        in response to at least the request, automatically identify, by the software application, at least one module associated with the software application having technical and logical information for locating and processing the information associated with the foreign data source;
        retrieve, by the software application, the information associated with the foreign data source from the foreign data source in accordance with the technical information;
        retrieve, by the software application, the information associated with the native data source from the native data source;
        dynamically link the information associated with the foreign data source with the information associated with the native data source in accordance with the technical information to enable merging of the information associated with the foreign data source and the information associated with the native data source; and
        merge, by the software application, at least a portion of the information retrieved from the foreign data source and at least a portion of the information retrieved from the native data source, wherein the software application uses the logical information to merge the foreign data source information and the native data source information and to integrate the foreign data source and the native data source in a logical domain of the software application.

7. The system of claim 6, wherein the one or more processors configured to merge the information associated with the foreign data source and the information associated with the native data source using the logical information are further configured to map the information associated with the foreign data source to identifiers compatible with information associated with native data source in accordance with the logical information without input from a user.

8. The system of claim 6, wherein the technical and logical information are stored in a reporting module, the reporting module integrated into the logical domain software application.

9. The system of claim 6, wherein the technical information comprises at least one of a database identifier, a database table identifier, a column identifier, an IP address, a logical location, a login name, a password, a data source identifier, a database command, or a key.

10. The system of claim 6, wherein the information associated with the foreign data source and the information associated with the native data source are linked through a foreign key table.

11. A method for data management retrieving and presenting information from foreign data sources to a user via a software application, comprising:
    receiving, by a software application, a request for information associated with a foreign data source incompatible with the software application and a native data source compatible with the software application, wherein the request is initiated by a user selection of the information associated with the foreign data source and the native data source at the software application;
    in response to at least the request, automatically identifying, by the software application, at least one module associated with the software application having technical and logical information for locating and processing the information associated with the foreign data source;
    retrieving, by the software application, the information associated with the foreign data source from the foreign data source in accordance with the technical information.
    retrieving, by the software application, the information associated with the native data source from the native data source;
    dynamically link the information associated with the foreign data source with the information associated with the native data source in accordance with the technical information to enable merging of the information associated with the foreign data source and the information associated with the native data source; and
    merge, by the software application, at least a portion of the information retrieved from the foreign data source and at least a portion of the information retrieved from the native data source, wherein the software application uses the logical information to merge the foreign data source information and the native data source information and to integrate the foreign data source and the native data source in a logical domain of the software application.

12. The method of claim 11, wherein merging the information associated with the foreign data source and the information associated with the native data source using the logical information comprises mapping the information associated with the foreign data source to identifiers compatible with information associated with the native data source in accordance with the logical information without input from a user.

13. The method of claim 11, wherein the technical and logical information are stored in a reporting module; the reporting module integrated into the logical domain of the software application.

14. The method of claim 11, wherein the technical information comprises at least one of a database identifier, a database table identifier, a column identifier, an IP address, a logical location, a login name, a password, a data source identifier, a database command, or a key.

15. The method of claim 11, wherein the information associated with the foreign data source and the information associated with the native data source are linked through a foreign key table.

* * * * *